UNITED STATES PATENT OFFICE.

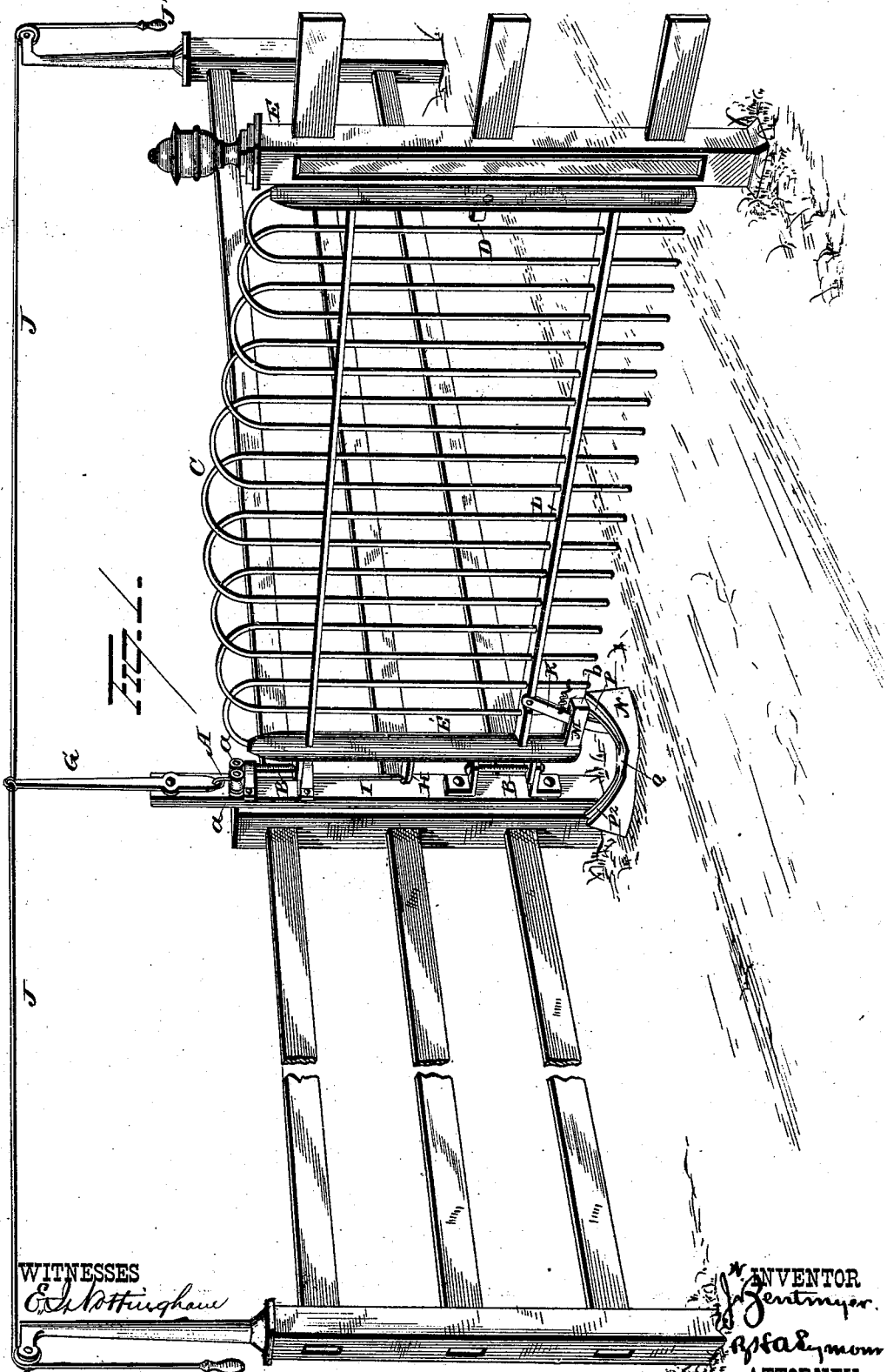

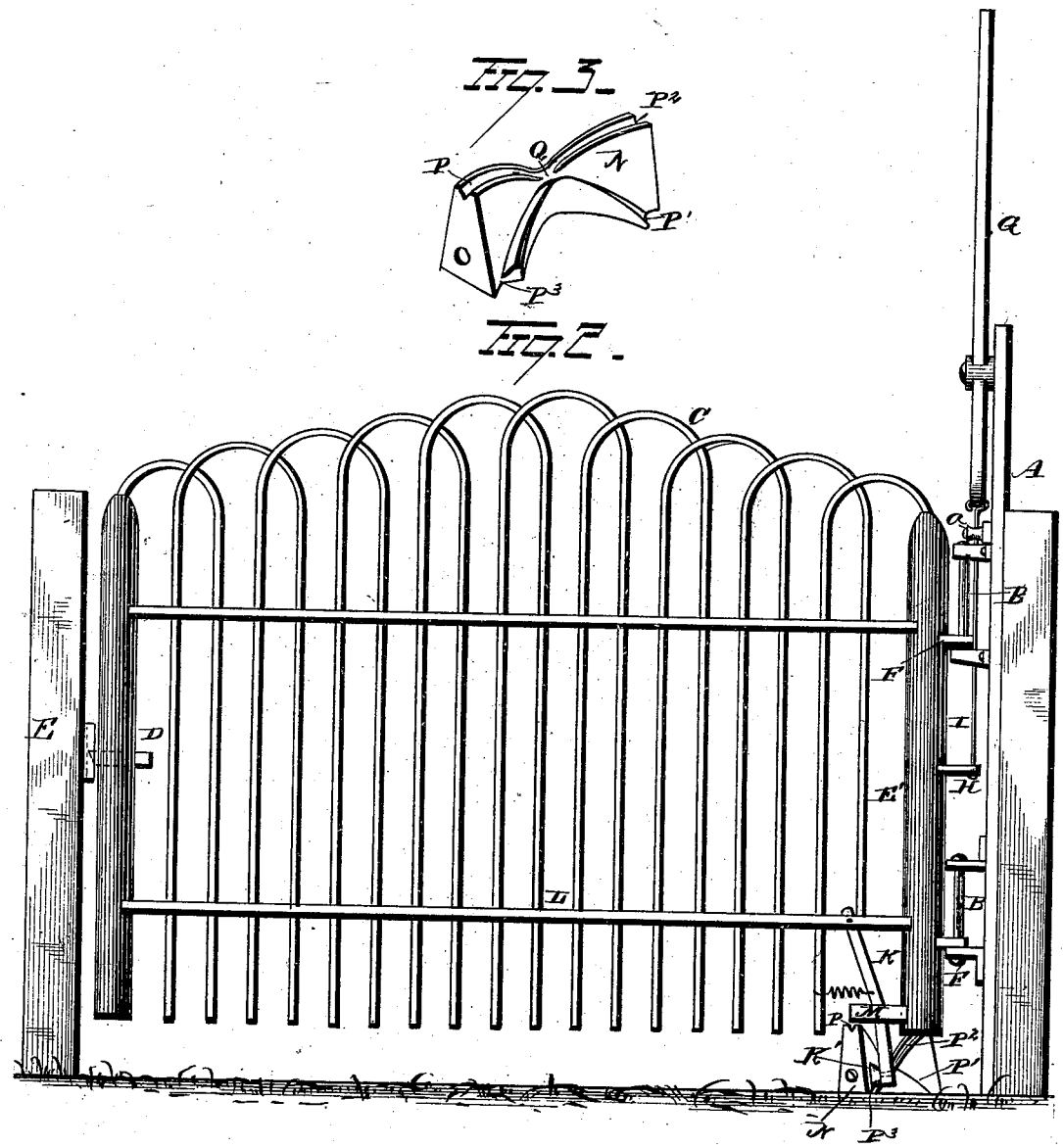

JACOB W. ZENTMYER, OF HAGERSTOWN, MARYLAND.

SWINGING GATE.

SPECIFICATION forming part of Letters Patent No. 253,810, dated February 14, 1882.

Application filed December 17, 1881. (No model.)

*To all whom it may concern:*

Be it known that I, JACOB W. ZENTMYER, of Hagerstown, in the county of Washington and State of Maryland, have invented certain new and useful Improvements in Swinging Gates; and I do hereby declare the following to be a full, clear, and exact description of the invention, such as will enable others skilled in the art to which it pertains to make and use the same.

My invention relates to an improvement in swinging gates, the object of the same being to provide a cheap, simple, and durable gate adapted to be opened from either side thereof from approaching vehicles without necessitating the stopping and alighting of the occupant, and adapted, when opened, to be retained in that position as long as desired, thereby allowing vehicles, &c., to pass through without the attendance of a person to hold it open.

With these ends in view my invention consists in certain details in construction and combinations of parts, as will be more fully explained, and pointed out in the claims.

In the accompanying drawings, Figure 1 is a perspective view, showing my improved gate in a closed position. Fig. 2 is a side view of the same, and Fig. 3 is an enlarged view of the track or guideway.

A represents the gate-post, adapted to be either secured to a sill or set directly in the ground, as desired, and is provided with the long staples B, by which the gate is secured thereto. This gate C in the present instance is made of metal, but can be constructed of wood, like any ordinary farm-gate, and is provided at its free end with the gravity-catch D, adapted to engage with a suitable stop on the post E and hold the gate in a closed position.

The rear vertical post, E', is provided with the eyebolts F, adapted to fit over the long staples B and hold the gate in its proper position, and at the same time allow it to move vertically while traveling from a closed to an open position, or vice versa.

The gate-post A is continued upward above the gate for a suitable distance, and is provided at or near the top with the operating-lever G, which latter is pivoted thereto in such a manner that there will be sufficient leverage to lift the gate vertically without requiring any great expenditure of power. The lower end of this lever G is connected to the eye or hook H, secured to the vertical post E', through the intervention of a chain or rope, I, which latter passes between the pulleys *a a*, while the upper end of the said lever is connected by means of the ropes J to suitable handles or hand-levers, J', situated on opposite sides of the gate, within easy reach of a person in a vehicle or on the ground. When either hand-lever J' is grasped and turned the upper end of the lever G is also moved toward the hand-lever being used, and lifts the gate vertically, when by releasing the said hand-lever the gate is caused, by mechanism to be hereinafter described, to turn outward until a position at right angles to its original position has been reached, where it remains.

K is an arm pivotally secured at its upper end to the horizontal brace L, and is provided at its lower end with the roller K'. This arm is held in position by the guides M, the end *b* of which forms the limit of outward movement of the arm K, and prevents the roller K' from moving beyond the track or guideway N when the gate has been moved vertically upward. This track or guideway N is made of cast metal, in the form shown, and consists of three separate and distinct tracks, one, P P', of which is traveled by the roller K' when the gate is being moved outward by the hand-levers, the one P² P³ for the roller when the gate is being closed by the hand-levers, and the one P' Q P³ for the roller when the gate is either opened or closed by simply pushing thereon.

The track or guideway N is shaped as shown in the drawings, and is provided, as before stated, with three tracks, two of which are single inclined tracks, and one double inclined track, P' Q P², which latter is only traversed continuously throughout its entire length when the gate is either opened or closed by pushing thereon. The two single inclined tracks P P' and P² P³ are each approximately formed in the arc of a circle, and are each provided with a V-shaped groove, in which the roller moves, and which prevents the said roller from running off the track.

As before stated, the arm K, when free to move, hangs or rests just over one of the single inclined tracks; but as the roller K' moves toward the bottom of either track the swinging arm K and roller K' are moved inward by engagement with the inclined surface of the concave face of the rail or guideway. When the gate is at rest in either a closed or open position the roller K' is always at the bottom of either track, as the case may be, and if the gate is opened by simply pushing thereon, the roller runs up the track P³ until it reaches the center Q thereof, and then runs by gravity alone down the opposite side until it reaches P', when the gate has been opened.

Supposing the gate to be closed and it is desired to open it by either hand-levers J' on opposite sides thereof. When the hand-lever J' is turned the upper end of the operating-lever G is caused to incline toward the hand-lever being moved, which lifts the gate sufficiently to allow the roller K' on the swinging arm to clear the top of the track or guideway N. When the roller is drawn above the track it is free to swing outward over the track P P', and when the hand-lever has been released the roller descends on the said track P P', which, being a single inclined one, causes the roller to run thereon until the bottom P' has been reached, where it remains. As this track P P' is not concentric with the axis of the gate, the roller K' is gradually forced backward or inward toward the vertical post. When it is desired to close the gate it is again moved vertically upward by the levers until the roller K' swings forward on the track P² P³, when by releasing the levers the gate is carried by gravity to its original closed position.

If desired, a small spring can be secured to the swinging arm to draw it forward on the track when the gate has been lifted vertically upward; but it is not necessary, as the swinging arm is generally placed in an inclined position, and will be of sufficient weight to cause it to swing forward by gravity and answer all the necessary purposes.

My improvement can be attached to any fence without disturbing the posts or any portion thereof. If the posts A should not be of sufficient height, a supplemental piece of sufficient height and having all the necessary parts can be secured thereto and answer all the desired purposes.

It is evident the slight changes in the construction and relative arrangement of the different parts might be resorted to without departing from the spirit of my invention, and hence I would have it understood that I do not limit myself to the exact construction of parts shown and described, but consider myself at liberty to make such changes as come within the spirit and scope of my invention.

Having fully described my invention, what I claim as new, and desire to secure by Letters Patent, is—

1. The combination, with a swinging gate adapted to be moved vertically, of a swinging arm adapted to rest over an inclined trackway when the said gate has been moved upward.

2. The combination, with the gate-post having a lever pivoted thereto, which latter is connected to suitable operating-handles, of a gate secured to the said post and connected to the said lever by suitable chain, by which the gate is moved upward, and provided with a swinging arm having a roller thereon, which latter is adapted to rest over inclined trackways when the gate is moved upward, substantially as set forth.

3. The combination, with a vertically-movable gate having an arm pivoted thereto, the latter being provided at its lower end with a roller, of a track or guideway provided with two single inclined tracks and a double inclined track, on which the said roller is adapted to move, substantially as set forth.

4. The combination, with a vertically-movable gate having an arm pivoted thereto, the latter being provided at its lower end with a roller, a guide for holding the said arm in position, and suitable levers and chains for operating the said gate, of a track or guideway provided with a single inclined track on which the said roller moves while the gate is being opened by the levers before referred to, a single inclined track on which the roller moves while the gate is being closed by the levers before referred to, and a double inclined track on which the roller moves when the gate is being either opened or closed by simply pushing thereon.

5. The combination, with the gate-post A, staples B, lever G, chain I, ropes J, and levers J', of the gate provided with the swinging arm K, the latter having the roller K' secured to its lower end, and the track or guideway N, the above parts being constructed and adapted to operate substantially as set forth.

6. The combination, with the gate-post A, staples B, lever G, rope or chain I, ropes J, levers J', and pulleys $a$ $a$, of the gate having the swinging arm K pivoted thereto, the latter being provided at its lower end with the roller K', the guide M, and the track or guideway N, all of the above parts being constructed and adapted to operate substantially as set forth.

In testimony whereof I have signed this specification in the presence of two subscribing witnesses.

JACOB W. ZENTMYER.

Witnesses:
A. W. BRIGHT,
HERMAN MORAN.